United States Patent
Perrin et al.

(10) Patent No.: US 9,135,262 B2
(45) Date of Patent: Sep. 15, 2015

(54) SYSTEMS AND METHODS FOR PARALLEL BATCH PROCESSING OF WRITE TRANSACTIONS

(71) Applicant: Oracle International Corporation, Redwood City, CA (US)

(72) Inventors: Neil Veness Perrin, Westminster, CO (US); Roch Bourbonnais, Cottier (FR); Bradley Romain Lewis, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 231 days.

(21) Appl. No.: 13/656,350

(22) Filed: Oct. 19, 2012

(65) Prior Publication Data

US 2014/0115016 A1  Apr. 24, 2014

(51) Int. Cl.
*G06F 17/30* (2006.01)
*G06F 11/14* (2006.01)
*G06F 13/16* (2006.01)

(52) U.S. Cl.
CPC ...... *G06F 17/30115* (2013.01); *G06F 11/1435* (2013.01); *G06F 13/1689* (2013.01); *G06F 17/30067* (2013.01); *G06F 17/30445* (2013.01)

(58) Field of Classification Search
CPC .......... G06F 17/3038; G06F 17/30224; G06F 17/30227; G06F 17/30377
USPC .................................................. 707/826, 764
See application file for complete search history.

(56) References Cited

U.S. PATENT DOCUMENTS

| | | | |
|---|---|---|---|
| 8,099,396 B1 * | 1/2012 | Novick et al. ................. | 707/661 |
| 8,234,317 B1 * | 7/2012 | Pogde ........................... | 707/821 |
| 2004/0193658 A1 * | 9/2004 | Kawamura et al. ........... | 707/202 |
| 2007/0106679 A1 * | 5/2007 | Perrin et al. .................. | 707/100 |
| 2007/0112884 A1 * | 5/2007 | Perrin et al. .................. | 707/202 |
| 2009/0064147 A1 * | 3/2009 | Beckerle et al. .............. | 718/101 |
| 2011/0072060 A1 * | 3/2011 | Dodge .......................... | 707/826 |
| 2011/0246434 A1 * | 10/2011 | Cheenath et al. ............. | 707/703 |
| 2012/0023369 A1 * | 1/2012 | Bourbonnais et al. ......... | 714/16 |
| 2012/0197838 A1 * | 8/2012 | Whelan et al. ................ | 707/609 |

FOREIGN PATENT DOCUMENTS

WO  WO2012/052800 A1 *  4/2012  .............. G06F 11/10

* cited by examiner

*Primary Examiner* — Reginald Bragdon
*Assistant Examiner* — Michael Westbrook
(74) *Attorney, Agent, or Firm* — Polsinelli PC

(57) ABSTRACT

A system and method is provided for parallel processing of multiple write requests to write data associated the multiple write requests to a storage area concurrently. The file system receives a series of write request from one more applications executing on the computing device. The file system includes one or more processing modules that selectively groups writes request into lists or trains. After the processing modules begin processing first threads associated with writes in a first train, the processing modules determines whether and when to initiate processing of second threads associated with writes in a second train during processing of the first threads.

20 Claims, 7 Drawing Sheets

SYSTEMS AND METHODS FOR PARALLEL BATCH PROCESSING OF WRITE TRANSACTIONS

TECHNICAL FIELD

Aspects of the present disclosure relate to computer systems and file storage systems, and in particular, systems and methods for enabling parallel processing of write transactions.

BACKGROUND

As the number of computing devices increase across society, electronic data management has become increasingly challenging. Modern devices create and use ever increasing amounts of electronic data ranging from digital photos and videos, to large data sets related to any number of topics including energy exploration, human resources, seismic activity, and gene research. This explosion in digital data has naturally led to ever increasingly large amounts of data that must be stored. Correspondingly, the data storage field is under constant pressure to increase size, performance, accessibility, reliability, security, and efficiency of data storage systems.

Computing devices typically include file systems that provide procedures for storing, retrieving, and updating data associated with operations performed by an application or program executing on those computing devices. These file systems also manage the available space on the device(s) that store such data. It is important that file systems also be equipped with data recovery tools to minimize the loss of pertinent data as a result of a failure event or loss of power, such as from a power failure or hardware failure.

As a result, conventional file systems may include an intent logging feature to improve the resiliency of computer operations in the event of such failures. Intent logging refers to a process where the file system writes a record of the intent to perform a particular operation before actually performing that particular operation. The record is usually written to an intent log that is maintained in some relatively permanent or otherwise non-volatile medium, such as a hard disk.

In such conventional file systems, the intent log is configured to perform a batch commit for multiple I/O request received over time. As an example, as the intent log receives a series of I/O requests over a period of time, the requests are batched and committed collectively to write the data to the appropriate, storage area and/or slog. As a result, the storage area may receive a burst of writes during certain periods, which can add a significant amount of overhead, which reduces overall processing performance.

It is with these and other issues in mind that various aspects of the present disclosure were developed.

SUMMARY

According to one aspect, a system is provided for processing two or more write requests in parallel. The system includes at least one processor and a file system executing on the at least one processor. The file system receives a series of write requests from at least one application being executed by the at least one processor. Each write request includes detail data and a thread for writing data. The system also includes at least one processing module that is executed in response to the series of write requests.

The at least one processing module determines whether a first transaction list is eligible for processing based on at least one first thread processing attribute associated with the first transaction list. The first transaction list includes a first one or more corresponding transaction records. Each of the first or more transaction records identify first corresponding detail data and a first corresponding thread. The at least one processing module also executes the first corresponding thread for the first one or more corresponding transaction records to write the first corresponding detail data to a first at least one allocated block when the first transaction list is eligible for processing.

The at least one processing module also determines whether a second transaction list is eligible for processing based on the at least one first thread processing attribute and at least one second thread processing attribute associated with the second transaction list. The second transaction list includes a second one or more corresponding transaction records. Each of the second one or more corresponding transaction records identify second corresponding detail data and a second corresponding thread. The at least one processing module also executes the second corresponding thread for the second one or more corresponding transaction records during execution of the first thread to write the corresponding detail data to a second at least one allocated block when the second list is eligible for processing.

According to one aspect, a method is provided for processing two or more threads in parallel. The method includes receiving a series of write requests from at least one application at at least one processor. Each write request includes detail data and a thread for writing data. The method also includes determining whether a first transaction list is eligible for processing at the at least one processor based on at least one first thread processing attribute associated with the first transaction list. The first transaction list includes a first one or more corresponding transaction records that each identifies first corresponding detail data and a first corresponding thread. The method also includes processing a first corresponding thread for the first one or more corresponding transaction records at the at least one processor to write the corresponding detail data to a first at least one allocated block when the first transaction list is eligible for processing.

The method also includes determining whether a second transaction list is eligible for processing at the at least one processor based on the at least one first thread processing attribute and at least one second thread processing attribute associated with the second transaction list. The second transaction list includes a second one or more corresponding transaction records that each identifies second corresponding detail data and a second corresponding thread. The method further includes processing a second corresponding thread for the second one or more corresponding transaction records at the at least one processor during execution of the first thread to write the corresponding detail data to a second at least one allocated block when the second list is eligible for processing.

According to one aspect, a system is provided for processing two or more write requests in parallel. The system includes at least one processor and a file system executing on the at least one processor. The file system receives a series of write requests from at least one application being executed by the at least one processor. Each write request includes detail data and a thread for writing data. The system also includes at least one processing module that is executed in response to the series of write requests.

The at least one processing module determines whether a first train is eligible for processing based on at least one first thread processing attribute associated with the first train. The first train includes at least one first car and each car includes a first one or more corresponding transaction records. Each of the first one or more corresponding transaction records identify first corresponding detail data and a first corresponding thread. The at least one processing module also executes the first corresponding thread for the first one or more corresponding transaction records to write the first corresponding detail data to a first at least one allocated block when the first transaction list is eligible for processing.

The at least one processing module also determines whether a second train is eligible for processing based on the at least one first thread processing attribute and at least one second thread processing attribute associated with the second train. The second car at least one second car and each second car includes a second one or more corresponding transaction records. Each of the second one or more corresponding transaction records identify second corresponding detail data and a second corresponding thread. The at least one processing module also executes the second corresponding thread for the second one or more corresponding transaction records during execution of the first thread to write the corresponding detail data to a second at least one allocated block when the second list is eligible for processing.

BRIEF DESCRIPTION OF THE FIGURES

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

FIG. 5C is a block diagram depicting cars of a train.

DETAILED DESCRIPTION

Aspects of the present disclosure involve a system and method for advantageously enabling concurrent processing of synchronous write requests issued to a file system by an application being executed on a computer system. In particular, the present disclosure involves a system and method for improving intent logging in file systems. Intent logging refers to a process where the file system writes a log block of the intent to perform a particular operation associated with a particular write request before actually performing that particular operation. The log block is usually written to an intent log that is maintained in some relatively permanent medium, such as disk. The intent log is a serialized data structure that maintains and requires a serial or chain relationship between the log blocks recorded therein. Stated differently, each log block in the intent log depends on the previous log block being recorded therein. By serializing log blocks in the intent log, such blocks can subsequently be written to a different storage area and maintain the relationship between blocks and, thus, maintained data consistency.

According to one aspect, the system and method enables parallel processing of synchronous write transactions and other dependent transactions to write a chain of log blocks from the intent log to a storage area. By processing multiple write transactions (write requests) in parallel, the file system 106 avoids sending a burst of writes to target storage devices and, thus, commits writes to the target in a more consistent and constant manner, which provides considerable overall performance improvements.

According to another aspect, the system and method enables parallel processing by selectively grouping incoming write requests into separate groupings or listings. Thereafter, operations required by write request(s) in a particular grouping of write request can be performed while data is gathered for the operations required by the write request(s) in a different grouping.

Figure 1:
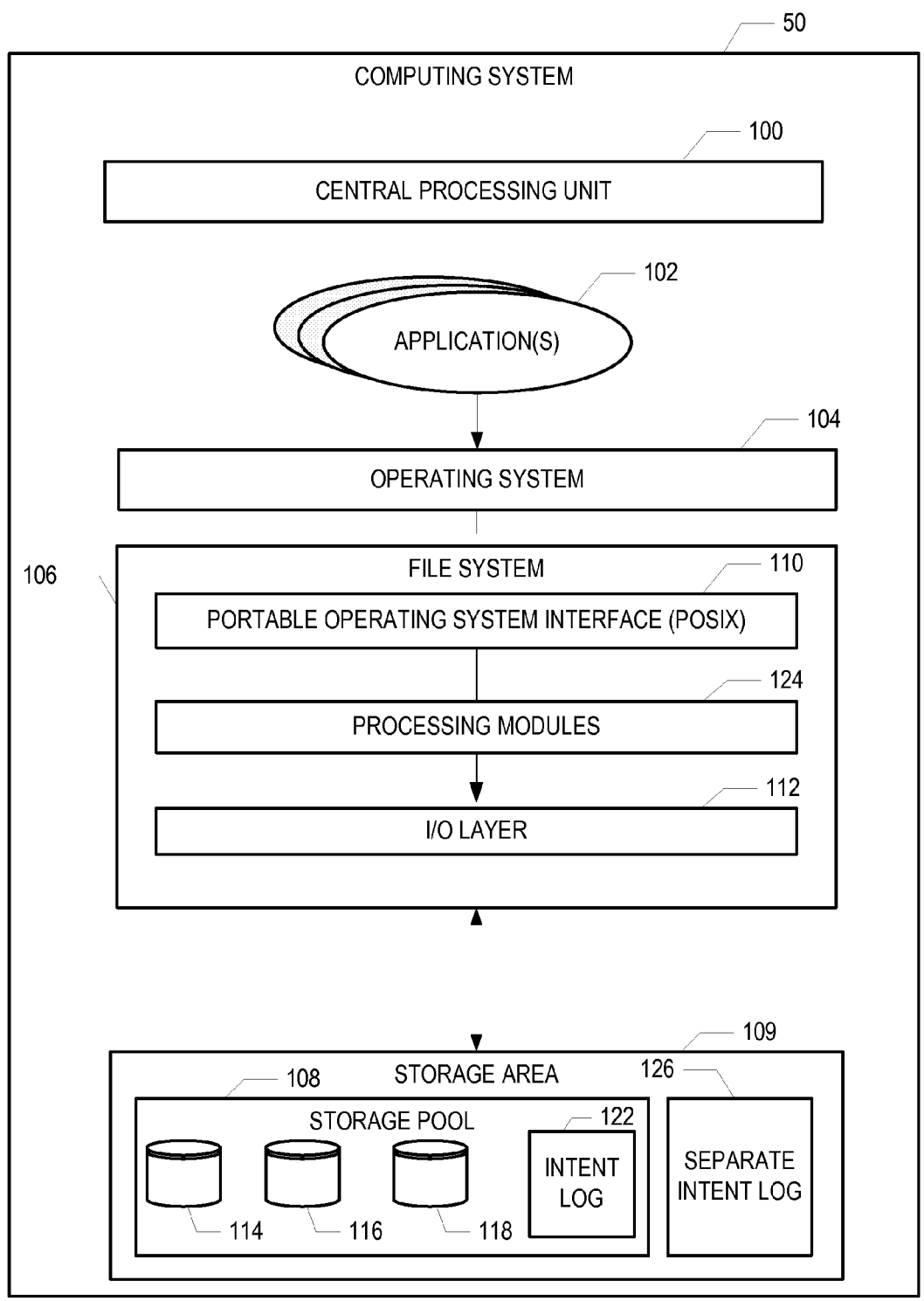
FIG. 1 is a block diagram of a computing environment for implementing a parallel processing system according to one aspect of the disclosure.

FIG. 1 depicts a computer architecture of a computing system 50 in accordance with an embodiment of the disclosure. The computing system 50 includes a central processing unit (CPU) 100 that may involve different processing arrangements involving one or more processors, one or more cores, and other computing devices. The CPU 100 is configured to execute one or more applications 102, an operating system 104, and/or a file system 106. The one or more applications 102 may be software applications that perform any number of tasks including database management, word processing, enterprise solutions, human resource management, etc. Each of one or more applications 102 works in conjunction with the operating system 104.

The operating system 104 provides an interface between the one or more applications 102 and computer hardware, so that each application can interact with the hardware according to rules and procedures provided by the operating system 104. The operating system 104 also includes functionality to interact with the file system 106, which in turn interfaces with a storage pool 108, whereby users may interact with stored data through read, write, open, close and other commands.

The operating system 104 typically interfaces with the file system 106 via a system call interface, such as a portable operating system interface (POSIX) 110. The POSIX interface 110 is the primary interface for interacting with the file system 106 and represents a standard that defines services that the file system 106 provides. Specifically, the POSIX interface 110 presents a file system abstraction of files and directories. The POSIX interface takes instructions from the OS-kernel level (not shown) on input/output (I/O) requests.

According to one aspect, the file system 106 is an object-based file system (i.e., both file data and metadata are stored as objects). More specifically, the file system 106 includes functionality to store file data and corresponding file detail data in the storage pool 108. Thus, the aforementioned operations provided by the operating system 104 correspond to operations on objects.

A request to perform a particular operation is forwarded from the operating system 104, via the POSIX interface 110, to the file system 106. The file system 106 translates the request to perform an operation on an object directly to a request to perform a read or write operation (i.e., an I/O request) at a physical location within the storage pool 108. Further, the file system 106 includes functionality to read the data from the storage pool 108 or write the data into the storage pool 108.

For example, the file system 106 further includes an I/O layer 112 that facilitates the physical interaction between the file system 106 and the storage pool 108. The I/O layer 112 typically holds the I/O requests for a particular physical disk within the storage pool 108. For example, after a file update operation (or write operation) is initiated by a particular application 102, the application 102 issues a write I/O request ("write request"). The file system 106 can be configured to pass one or more data blocks representing the file update to the I/O layer 112 for routing to one of the physical storage devices and/or resources 114, 116, and 118 in the storage pool 108 located in a storage area 109.

According to another aspect, the file system 106 is a logical volume manager, such as provided by the ZFS file system. Unlike traditional file systems, which may reside on single devices and, thus, require a volume manager to use more than one device, ZFS file systems include virtual storage pools referred to as zpools. A zpool is constructed of virtual devices (vdevs), which are themselves constructed of block devices: files, hard drive partitions or entire drives, with the last being the recommended usage. Block devices within a vdev may be configured in different ways, depending on needs and space available: non-redundantly (similar to RAID 0), as a mirror (RAID 1) of two or more devices, as a RAID-Z (similar to RAID-5) group of three or more devices, or as a RAID-Z2 (similar to RAID-6) group of four or more devices.

A common operation initiated by an application 102 is a synchronous write request. When the application 102 issues a synchronous I/O requests to write data, the application 102 must wait for a response from the file system that indicates the data has been written to stable storage, such as a hard disk in the storage pool 108 before continuing processing. Another common operation initiated by the application 102 is an asynchronous write request. When the application 102 issues an asynchronous I/O request to write data, the application continues without waiting even though the data may be buffered in a file system cache, but not yet written to disk. As a result, asynchronous writes are generally faster and, thus, less likely to affect the processing performance of the application as experienced by a user.

Often there is more to a write request than merely writing the data to disk. Namely, the I/O layer may provide a variety of different services for the request, which alone and collectively consume overhead (i.e. take additional processing time above that required to write the data to disc). Such services may include compression, encryption, aggregation, queuing, resource scheduling, and checksum validation. Because the application 102 must wait for data to be completely written to stable storage when issuing synchronous I/O request, the performance (e.g., processing time) of the application can be adversely affected as the number of synchronous I/O requests received by the file system 106 increase and those I/O requests also require additional services.

After the application 102 issues a synchronous write request, the file system 106 caches the data, such as in a level 1 cache including DRAM, but the application 102 also needs to ensure that the data is written to stable storage before continuing processing. A write operation, however, also involves storing the data in a non-volatile storage, such as spinning disks, as the data in the cache will eventually be evicted. Because writing data to the regular on-disk data structures requires additional processing time, the file system 106 is configured to temporarily store the data in an intent log 122, as well as the cache. Stated differently, before performing an operation corresponding to a synchronous I/O request, a record of the data associated with of the intent to perform that particular operation is written in the intent log 122, which is typically stored in a non-volatile or other relatively permanent medium such as a hard disk. One purpose of the intent log 122 is to improve the resiliency of certain computer operations associated with issued write requests in the event of failures, such as power failures and/or hardware failures. For example, after the data has been written to the intent log 122, the write request complete status is returned back to the application 102 and the application 102 can continue providing a particular service and/or completing a particular task. Thus, the file system processes synchronous writes faster to commit them to stable storage in the intent log 122 and then write them to a storage pool such as 108.

While the data is stored in the intent log 122, the various services required to complete or commit the I/O request may proceed without holding up the application. The file system 106 writes all the data accumulated in the intent log 122 to one or more of the storage devices 114, 116, and 118 in an orderly and efficient fashion. The intent log is also then updated and the intent log information for specific data that has been written to stable storage, which is marked as "completed." This may occur at a specified interval (e.g., every 5 seconds). Should a failure occur, the file system 106 retrieves the required data from the intent log 122 after a reboot and replays the transaction record to complete the transaction.

Although the intent log 122 is primarily described herein in connection with logging data blocks for synchronous transactions, it is contemplated that data blocks associated with asynchronous transactions can also be maintained by the intent log 122. Asynchronous transactions are written to the intent log 122 when they are required by a synchronous transaction. For instance, a synchronous write to a file would force an asynchronous create transaction of that same file to be committed to the intent log if such a create transaction were present in the intent log.

Data can be written to the intent log 122 faster than it can be written to the regular storage pool 108 because the intent log 122 does not require the overhead of updating file system metadata and other housekeeping tasks. However, when the intent log 122 is located on the same disk or shares storage resources with the storage pool 108, there will be competition between the intent log 122 and the regular pool structures over processing resources. This competition can result in poor processing performance when there are a significant number of synchronous writes being issued by the one or more applications, for example. This can have the effect of the one or more application appearing slow to users.

The file system 106 may be configured to selectively write or record data included in a write request directly to a discrete or separate intent log (i.e., SLOG) 126 in the storage area 108. For example, the file system 106 may be configured to write data associated with a simple synchronous request to the SLOG 126. Simple synchronous requests, such as small write requests, do not require the high overhead services required by more complex write requests.

In conventional file systems, the intent log 122 is configured to perform a batch commit for multiple write request received over time. As an example, as the intent log 122 receives a series of write requests over a period of time, they are batched and will be committed collectively to write the data to the appropriate storage area and/or SLOG 126. Moreover, during a period of time that the first series of write requests are being committed, the intent log 122 may receive another series of write requests which are also batched and committed collectively to write the data to the appropriate, storage area and/or SLOG 126. Stated differently, as one batch commits, another is formed, and so on and so forth.

During this conventional batch/commit process, each write request is committed sequentially according to the order it was received at the intent log 122. Each write request includes a thread that identifies one or more operations that must be performed in connection with a particular write request. For example, a thread may require copying, encryption, compression, etc. in connection with the particular write requests. As a result, the storage area may receive a burst of writes during certain periods, which can adversely affect processing capacity due to the one or more operation required by the threads included in each write request.

Figure 2A:
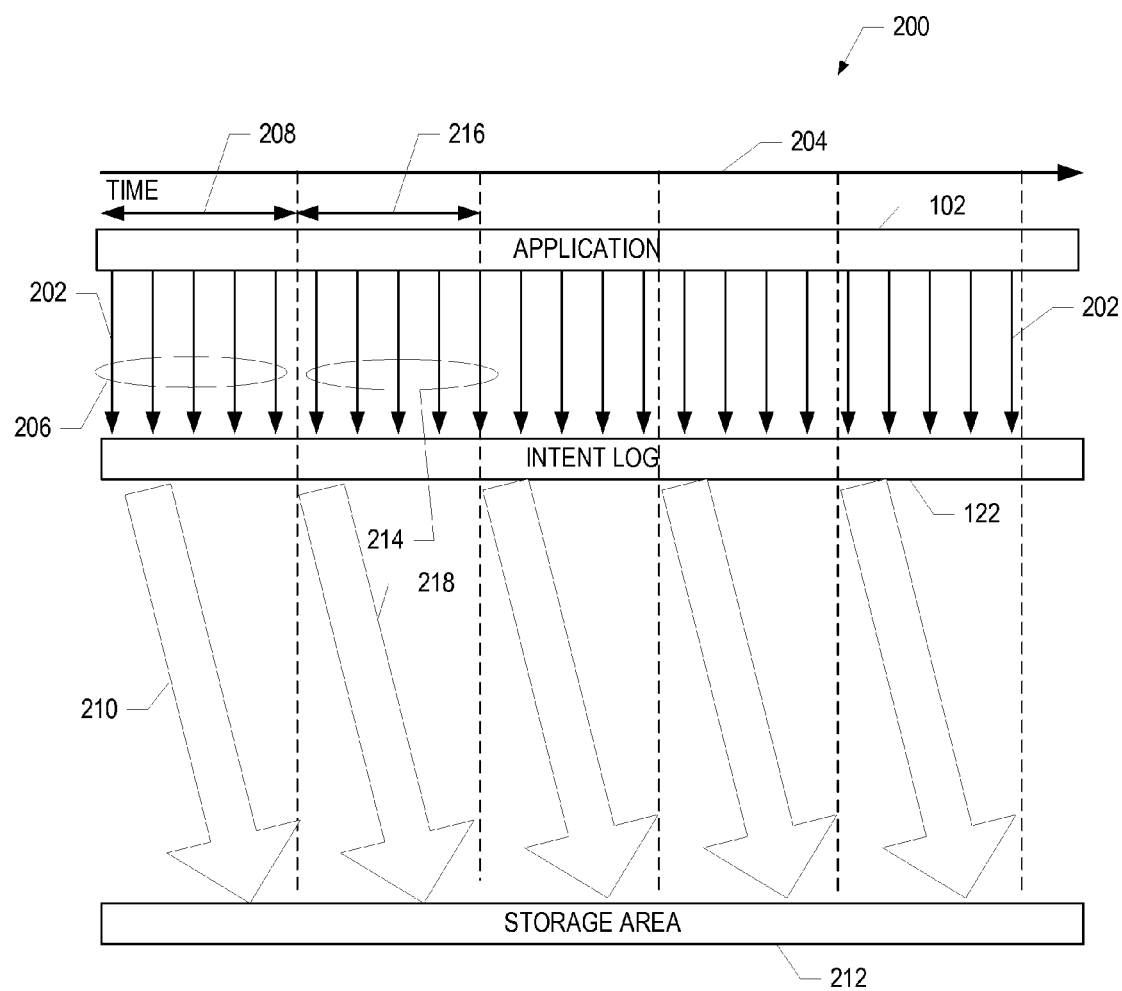
FIG. 2A illustrates a conventional batching process for write requests.

Referring briefly to FIG. 2A, a conventional batch commit process 200 for write requests is illustrated. In this example, a series of write requests 202 are received at the intent log 122 from the application 102 over time, as indicated by time line 204. The intent log 122 batches, as indicated by 206, the series of write requests 202 received during a first time period 208. The series of transactions included in the batch 206 are collectively committed, as indicated by 210, to write data to the appropriate storage area 212. The appropriate storage area 212 may correspond to the previously described intent log 122 or stable storage 108 in storage area 109.

The intent log 122 then batches, as indicated by 214, a next series of write requests 202 received during a subsequent time period 216. The series of write requests 202 included in the batch 214 are then collective committed, as indicated by 218, to write data to the appropriate storage area 212. As can be seen from FIG. 2A, the committing 218 of the series of write requests 202 in batch 214 does not begin until the committing 210 of the series of write requests 202 in batch 206 is complete.

Figure 2B:
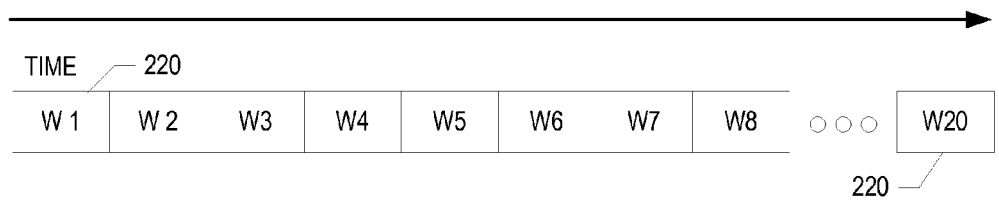
FIG. 2B is a block diagram illustrating a processing sequence of transactions via the conventional batching process.

FIG. 2B is a block diagram that further illustrates the sequential processing scheme of a conventional batch commit process 200. For purposes of illustrating a conventional sequential scheme, the example discusses a series of twenty individual write requests 220 received over a period of time. These twenty write requests may, for example, be grouped into four different batches that each includes five write requests. As can be seen, all twenty write requests 220 must ultimately be committed sequentially over time until all twenty have been written to storage.

According to aspects of the disclosure, the file system 106 includes one or more processing modules 124 to enable parallel processing of multiple write requests to simultaneously write data associated the multiple write requests to a storage area concurrently. By processing multiple write requests, the file system 106 avoids sending a burst of writes to target storage devices and, thus, commits writes to the target in a more consistent and constant manner.

Figure 3A:
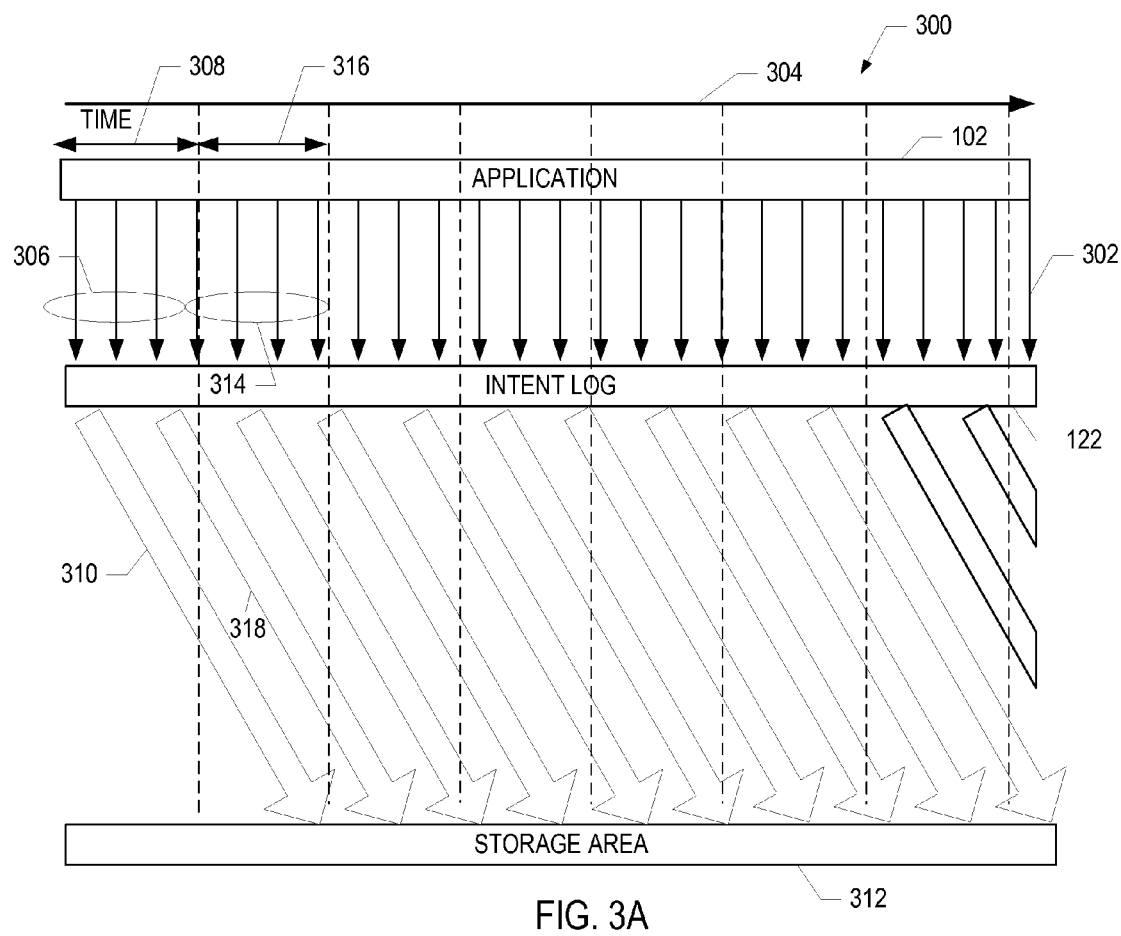
FIG. 3A illustrates a parallel batching process for write requests according to aspects of the parallel processing system.

Referring now to FIG. 3A, a parallel commit process 300 for multiple write requests is illustrated. In this example, a series of write requests 302 are received at the intent log 122 from the application 102 over time, as indicated by time line 304. According to one aspect, a series of write requests 302 received during a first time period 308 are grouped or batched, as indicated by 306, until a threshold data size or limit is reached. The series of transactions included in the batch 306 are committed, as indicated by 310, to write data to the appropriate storage area 312. The appropriate storage area 312 may correspond to the previously storage area 109."

The intent log 122 then batches, as indicated by 314, a next series of write requests 302 received during a subsequent time period 316. The series of write requests 302 included in the batch 314 are committed, as indicated by 318, to write data to the appropriate storage area 312. However, as can be seen from FIG. 3A, committing the series of write requests 302 in the batch 314 begins while the series of write requests 302 in batch 306 are being committed.

Figure 3B:
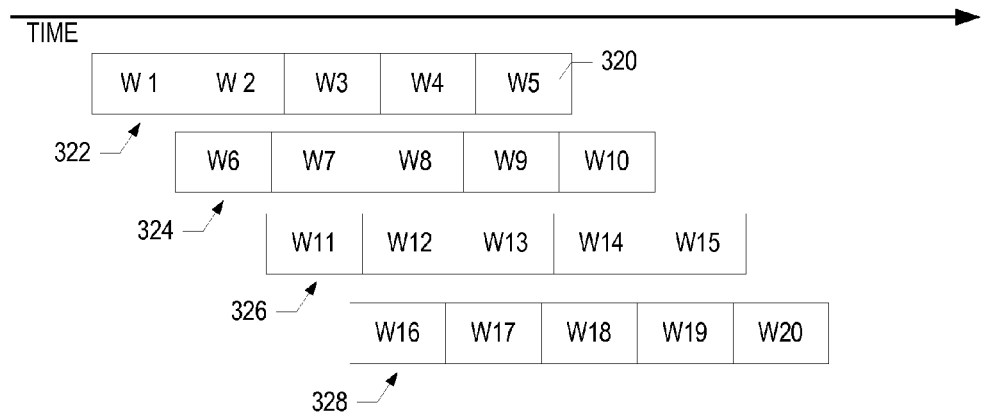
FIG. 3B is a block diagram illustrating a processing sequence of transactions via the parallel batching process.

FIG. 3B is a block diagram that further illustrates the parallel processing scheme of the parallel commit process 300. In this example, a series of twenty individual write requests (e.g., W1-W20) 320 are received over a period of time. These twenty write requests may, for example, be grouped into four different batches 322, 324, 326, 328 that each includes five write requests. As can be seen, during a time that write requests 320 in batch 322 are being committed, write requests 320 in batch 324 can begin committing.

Each of the batches 306, 314 or list of transaction records described in FIGS. 3A and 3B are referred to herein as a "train. As explained in more detail below in reference to FIG. 5C, each train may include one or more cars. According to one aspect, each car corresponds to a different write request received from the application. According to another aspect, each car may be associated with a single write request that has been divided into two or more segments due original size of the write requests. For example, if a particular write request exceeds a certain threshold size (e.g., 1 megabyte), that write request may be segmented into multiple cars.

Figure 4A:
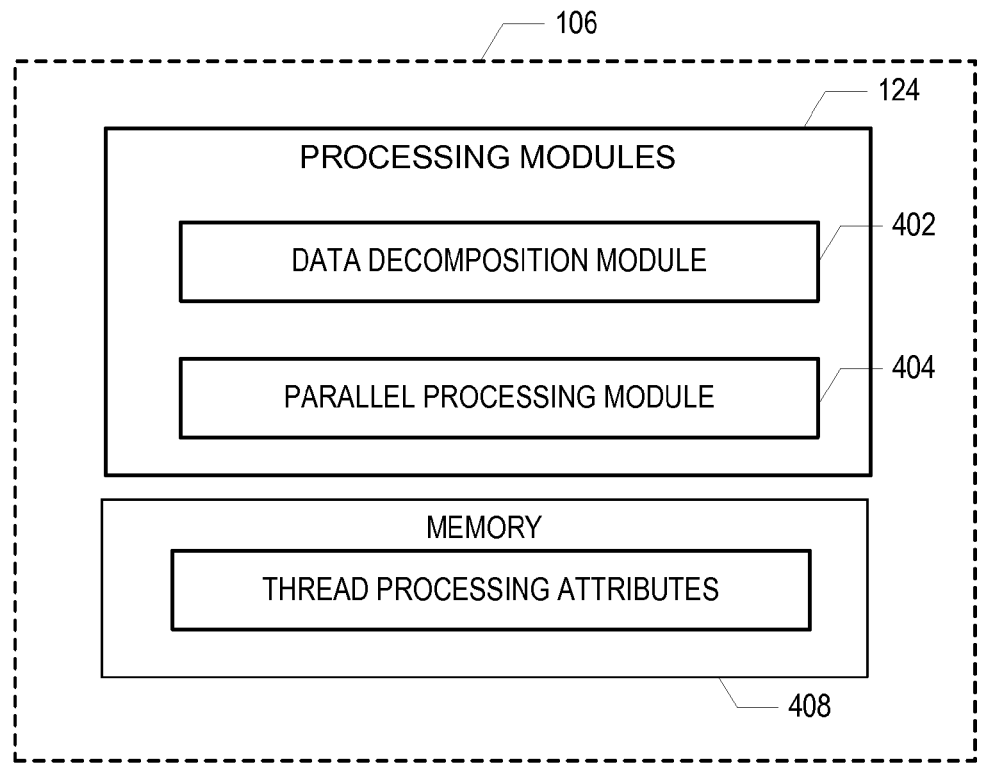
FIG. 4A is a block diagram of a file system configured with processing modules according to one aspect of the parallel processing system.

FIG. 4A is a block diagram depicting processing modules 124 of the file system 106 that are executable and/or executed by the CPU 100 to enable parallel processing of multiple write requests. As described above, the file system 106 receives write requests from one or more applications 102 via the operating system 104. A data decomposition module 402 receives the write request, which includes block data, such as a metadata or other detail data that describe the write request.

Figure 4B:
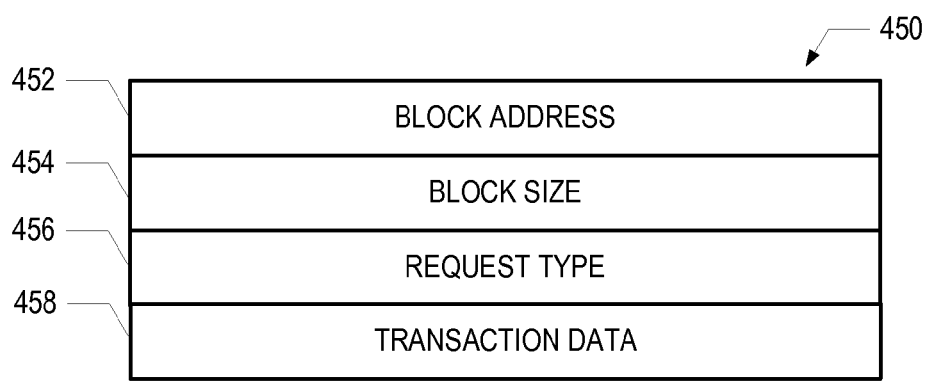
FIG. 4B is a block diagram of a write request.

For example, referring to FIG. 4B, a write request 450 in accordance with an illustrative embodiment of the disclosure is depicted. In this example, the write request 450 includes detail data, such as a data block address 452, a data block length 454, a request type 456, and write transaction data 458. A block address 452 is an address that maps or points to a physical address for data that is stored to a media in a logical progression. The block length is the length, usually in bytes, of the associated data block. The request type 456 indicates, for example, whether write request is synchronous request or asynchronous request. It is contemplated that the write request may include additional information and data. Write transaction data 458 is, for example, data received from an application that is being written to the storage area 108.

Referring back to FIG. 4A, the data decomposition module 402 creates a corresponding transaction record for each write request received from the application 102. The transaction record is, for example, an intent transaction (ITX) record. The transaction record includes the detail data included in the corresponding write request. The transaction record also includes order data that indicates when the corresponding write request was received relative to other write request (e.g., time stamp data).

Figure 4C:
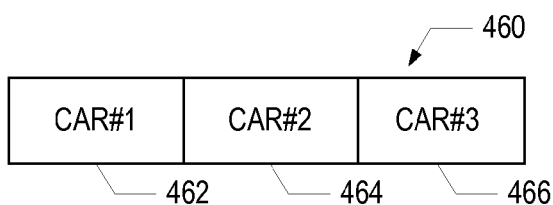
FIG. 4C is a block diagram of a train with cars according to one aspect of the parallel processing system.

The data decomposition module 402 also creates trains that each includes one or more transaction records. Each transaction record is added to a train based on one more train (or train list) parameters. In particular, transaction records are added to one or more cars in a particular train. For example, FIG. 4C depicts a train 460 that includes three cars 462, 464, 466.

According to one aspect, train parameters specify a car threshold data limit (e.g., data block length or size of all transaction records). For example, the number of transaction records added to a particular car depends, for example, on the amount of data associated with each transaction record and the car threshold data limit. Stated differently, transaction records are added to a particular are until the train threshold data limit for that particular train is reached.

According to one aspect, the car threshold data limit is predefined and stored in a memory of the file system based on target storage device. For example, if the storage area is a SLOG, the car threshold data limit (e.g., data block length or size of all transaction records) associated with a car may be 32 kilobytes. As another example, if storage area is a general storage pool, the car threshold data limit associated with a car may be 4 kilobytes.

According to another aspect, train parameters specify a threshold transaction record size. In this aspect, the data decomposition module 402 creates a train with multiple cars based on a single transaction record that exceeds the threshold transaction record size. For example, if a transaction record is associated with a one megabyte write request, the data decomposition module 402 creates a corresponding train that includes multiple cars that each includes portion of the transaction record data (e.g., eight cars of 128 kilobytes).

According to another aspect, transaction records are added to cars and/or trains according to their corresponding order data, such as time stamp data. Stated differently, the one or more transaction records are added to trains according to the order in which their corresponding write request was received at the file system 106.

According to one aspect, the number of cars added to a particular train depends on the amount of data in that particular train and/or whether data from another train is currently being written to storage. For example, if a particular train that includes at least one car that includes at least one transaction record and there is no data currently being written from another train to storage, that particular train will be deemed complete and ready for processing. Thereafter, the data decomposition module 402 will add transaction records to one or more cars of a new train.

Alternatively, if a particular train includes at least one car that is has not reached its data capacity limit (e.g., contains 32 kilobytes) and data is currently being written from another train to storage, that particular train with additional capacity will wait for additional transaction records.

Figure 5A:
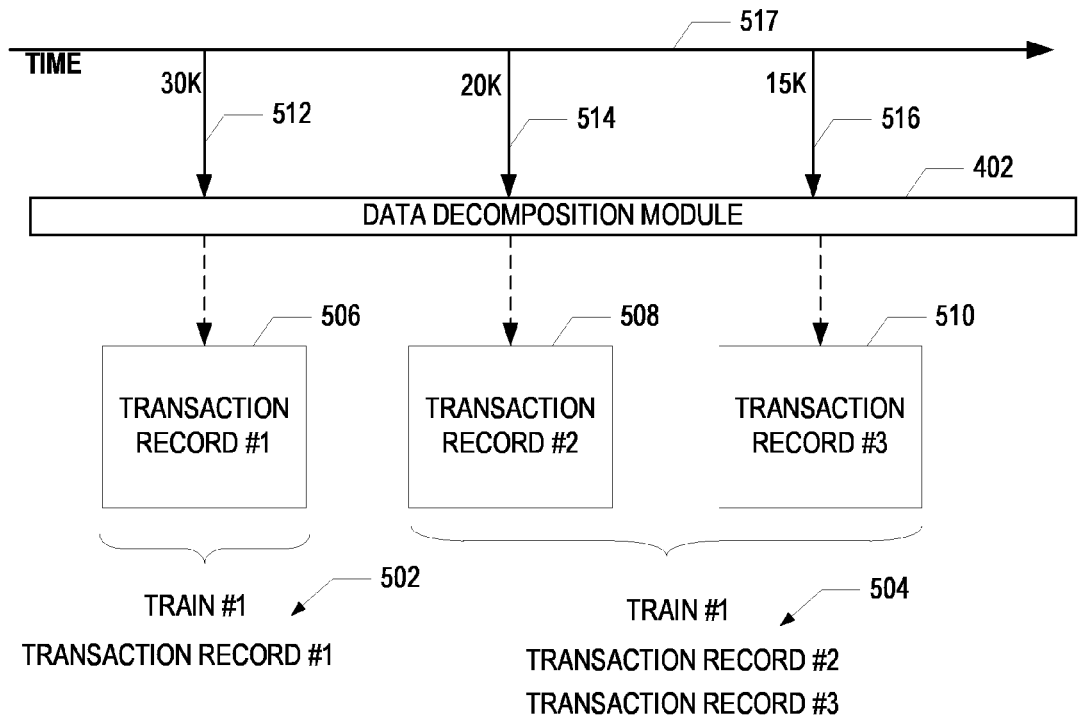
FIGS. 5A and 5B are block diagrams depicting the assignment of transaction records to trains.

FIG. 5A is a block diagram of exemplary trains 502, 504 created by the data decomposition module 402. FIG. 5A depicts three transaction records 506, 508, and 510 that are created from corresponding write requests 512, 514, and 516 that are received over time, as indicated by arrow 517. The transaction record 506 corresponds to a 30K write request, the transaction record 508 corresponds to a 20K write request, and the transaction record 510 corresponds to a 15K write request. In these examples, each of trains 502, 504 have a car threshold data limit of 32K. The train 502 corresponds to a list of transaction records that only includes transaction record 506. The train 504 corresponds to a list of transaction records that includes transaction records 508 and 510. The transaction records 506, 508, and 510 arranged in their respective trains 502, 504 according to the order their corresponding write requests were received.

Figure 5B:
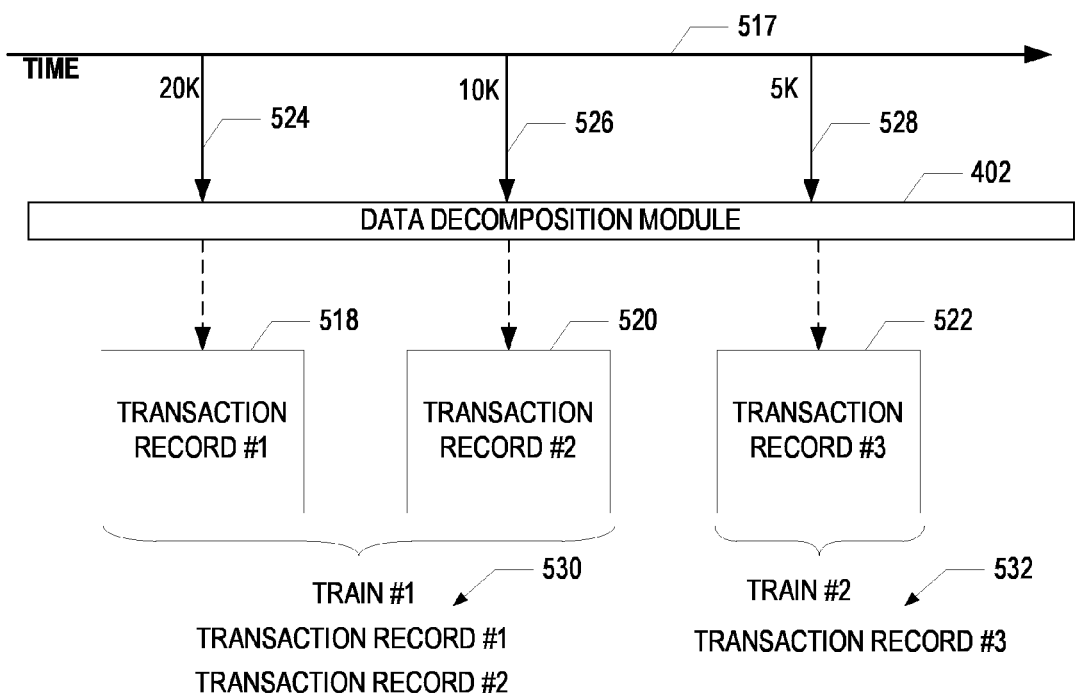

FIG. 5B is a block diagram of exemplary trains 530, 532 created by the data decomposition module 402. As shown in FIG. 5B, three transaction records 518, 520, and 522 are created from corresponding write request 524, 526, and 528 received over time 517. In this example, the transaction record 518 corresponds to a 20K write request, the transaction record 520 corresponds to a 10K write request, and the transaction record 522 corresponds to a 5K write request. The train 530 corresponds to a list that includes transaction record 518 and transaction record 520. The train 532 corresponds to a list that only includes transaction record 522. The transaction records 518, 520, and 522 are arranged in their respective trains 502, 504 according to the order their corresponding write requests were received.

FIG. 5C is a block diagram depicting cars included in trains 502, 504, 530, and 532 described in FIGS. 5A and 5B. As described above, the train 502 corresponds to a list of transaction records that only includes a transaction record (TR) 506. In this example, a single car 534 includes the single transaction record 506.

Train 504 corresponds to a list of two transaction records 508 and 510 and includes cars 536, 538. The cars 536, 538 include transaction records 508, 510 respectively. In this example, the transaction records 508, 510 are in separate cars because the total amount of data associated with transaction records 508, 510 exceeds, for example, a car data threshold limit of 32 kilobytes per car.

Train 530 corresponds to a list of two transaction records 518 and 520 includes a single car 540. The car 540 includes transaction records 518, 520. In this example, the transaction records 518, 520 are in the same car 540 because the total amount of data associated with transaction records 518, 520 is less than the car data threshold limit of 32K.

Train 532 corresponds to a list of transaction records that only includes a transaction record (TR) 522. In this example, a single car 542 includes the single transaction record 522.

Figure 6A:
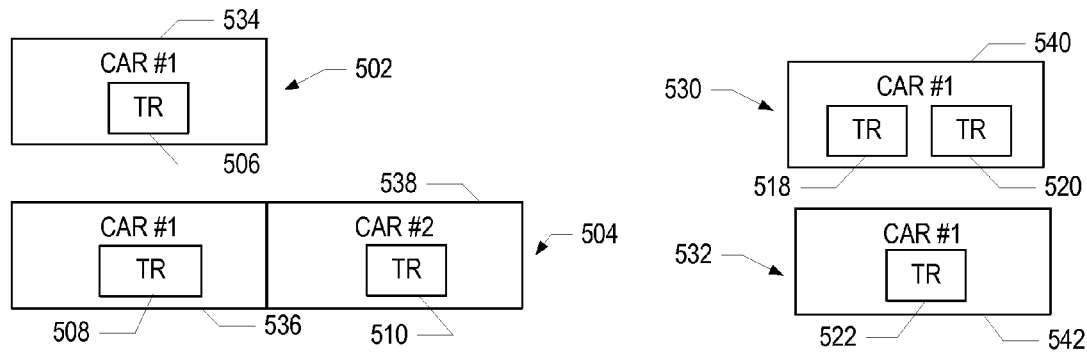
FIG. 6A is a block diagram illustrating the operations associated with a thread according to one aspect of the disclosure.
Figure 6A:
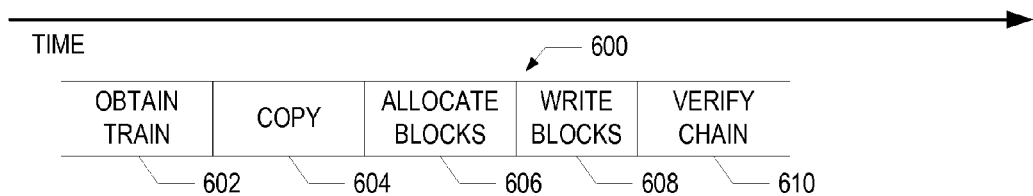

As described above, a particular write request typically includes a thread that identifies one or more services or operations that must be performed in connection with that particular write request. FIG. 6A depicts exemplary operations that are performed during a commit process of a thread according to aspects of the disclosure.

The commit process begins with an obtain operation 602. During the obtain operation a train (i.e., list of transaction records) that is eligible for processing is obtained from the intent log 122 based on one or more train eligibility attributes. The train eligibility attributes may indicate a train data amount attribute, a time stamp attribute, and train processing status attribute. The train data amount attribute indicates a current total amount of data included in a particular train. The time stamp attribute indicates a time that a write request associated with the last transaction record added to a particular train was received. Indicates whether another data associated with another train is currently being written to storage. Other examples of train eligibility attributes exist.

As an example, if the train data amount attribute indicates that a particular train with one car that has reached half that particular cars' storage capacity and the train processing status attribute indicates that there is no other train being processed, that particular train will be obtained for processing. As another example, if the train data amount attribute indicates that a particular train with one car is approximately half full of transaction records and the train processing status attribute indicates that there is another train being processed, one or more additional transaction records may be added to that train.

A copy operation 604 allocates a buffer and copies each transaction record included a train identified as eligible into the allocated buffer associated with the file system 106. For example, if a particular train identified as eligible includes three transaction records, the three transaction records and any detail data required to perform the corresponding write requests is copied into the allocated buffer.

A storage block allocation operation 606 allocates one or more blocks in the storage area to write the transaction records in the buffer will be written. The storage area may be a separate intent log (i.e., a SLOG) or a physical storage device (i.e., storage pool). The number of blocks allocated for the transaction records in the storage area is determined according to one or more block allocation rules. According to one aspect, the block allocation rules specify that each transaction record included within a particular car of a train should be allocated to the same block. For example, if a first car in a train includes two transaction records, those two transaction records will be allocated to the same block in the storage area. As another example, if a second car in a train includes one car, the data in that one car will e allocated to a different block in storage.

The storage block allocation operation 606 also attaches or appends a block identification parameter of the allocated block to each transaction record in the buffer. For example, a block sequence number and, a block data checksum is associated to transaction record in the buffer.

A write operation 608 writes the data associated with each transaction record to the allocated block that corresponds to the attached block identification parameter.

A verification operation 610 verifies that previous writes in the chain have completed so that the chain is stable. For example, if writes associated with a second train are completed before the writes associated with a first train are complete, the verification operation 610 delays a return call to the application indicating that the writes for the second train are complete until the writes for the first train are complete. Stated differently, if writes associated with the second train are completed before the writes in the first train, the second train has to wait for the writes in the first train to complete before a corresponding return call is generated.

Figure 6B:
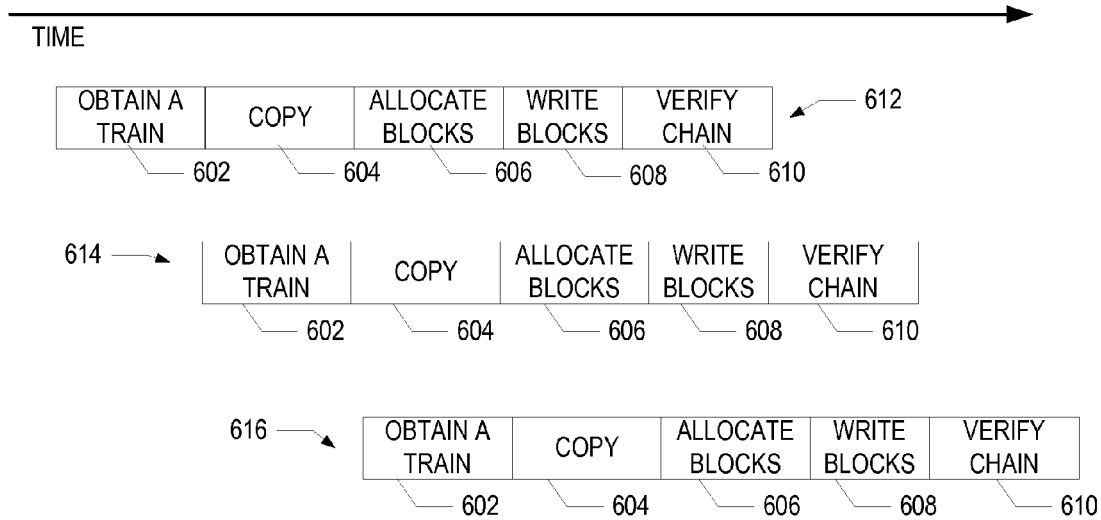
FIG. 6B is a block diagram illustrating the operations associated with multiple threads in a parallel processing scheme according to one aspect of the disclosure.

FIG. 6B depicts parallel processing of multiple threads in accordance with aspects of by the disclosure. In this example, threads 612, 614, 616 are depicted as being processed according to the parallel processing scheme enabled by the disclosure. Each of the threads 612, 614, 616 is configured to perform the operations 602-610 described above in reference to FIG. 6A. As shown in FIG. 6B, thread 614 may begin performing a particular operation while thread 612 is performing a different operation (i.e., a different operation state). Similarly, thread 616 may begin performing a particular operation while thread 614 is in a different operation state.

Referring back to FIG. 4A, a parallel processing module 404 monitors various thread processing attribute values associated with each of the one or more transaction records included in trains. Thread processing attributes may include, for example, a thread state attribute, a thread status attribute, a train identification attribute, and/or a train capacity attribute. The thread state attribute value indicates an operation that a particular thread is currently performing. The thread status attribute identifies, for example, whether or not a particular thread is in active commit process. The train identification attribute identifies a particular train associated with a particular thread. The train capacity attribute identifies an amount of data a particular train can receive without exceeding a threshold data amount or capacity. According to one aspect, the parallel processing module 404 maintains the thread commit attributes for trains in a memory 408.

The parallel processing module 404 determines whether to initiate or begin the commit process for thread in a particular train based on the value of one or more thread processing attributes. The following examples correspond to threads 612, 614, 616 depicted in FIG. 6B. When the parallel processing module 404 determines that thread 612 has thread state attribute value that indicates the thread 612 is currently in an obtaining state (i.e., performing an obtaining operation), the parallel processing module 404 will not commit thread 614. However, when the parallel processing module 404 determines that thread 612 has a thread state attribute value that indicates the thread 602 is currently in a copy state (i.e., performing a copy operation), the parallel processing module 404 may commit thread 614 based on one or more thread processing attribute values. This process continues for all threads in a particular train.

The parallel processing module 404 identifies a particular train associated with the thread 612 and thread 614 based on the train identification attributes included in the corresponding transaction records. For example, the parallel processing module 404 determines that thread 612 and thread 614 are associated with first and second trains, respectively, based on the corresponding train identification attributes. According to one aspect, the parallel processing module 404 begins processing transaction records included in a first train immediately if there are no other transactions currently being processed.

According to one aspect, the parallel processing module 404 determines whether to initiate or begin the commit process for thread 614 based on a train capacity attribute associated with the second train and the thread status attribute associated with the first train. For example, if a train capacity attribute indicates the first train only includes one car that has not reached it threshold capacity (e.g., car has less than 32 kilobytes) and the thread status attribute associated with the thread 612 indicates that the first train is currently being processed, the parallel processing module 404 delays committing thread 614 until thread 612 has completed processing. Alternatively, if a train capacity attribute indicates the first train includes one car that has reached it threshold capacity (e.g., car has greater than 32 kilobytes) and the thread status attribute associated with the thread 612 indicates that the first train is currently being processed, the parallel processing module 404 immediately commits thread 614 if, for example, thread 612 is not currently in an obtaining state.

According to another aspect, the parallel processing module 404 determines whether to initiate or begin the commit process for thread 614 based on a train capacity attribute associated with the second train and a predefined timeout period. For example, if the second train only includes one car that has not reached it threshold capacity (e.g., car has less than 32 kilobytes), the parallel processing module 404 only delays committing thread 614 for a predefine period of time even when no other thread is being processed.

According to another aspect, the parallel processing module 404 removes a particular train from the file system after verification operation has been complete for each of the one or threads associated with that particular train.

Figure 7:
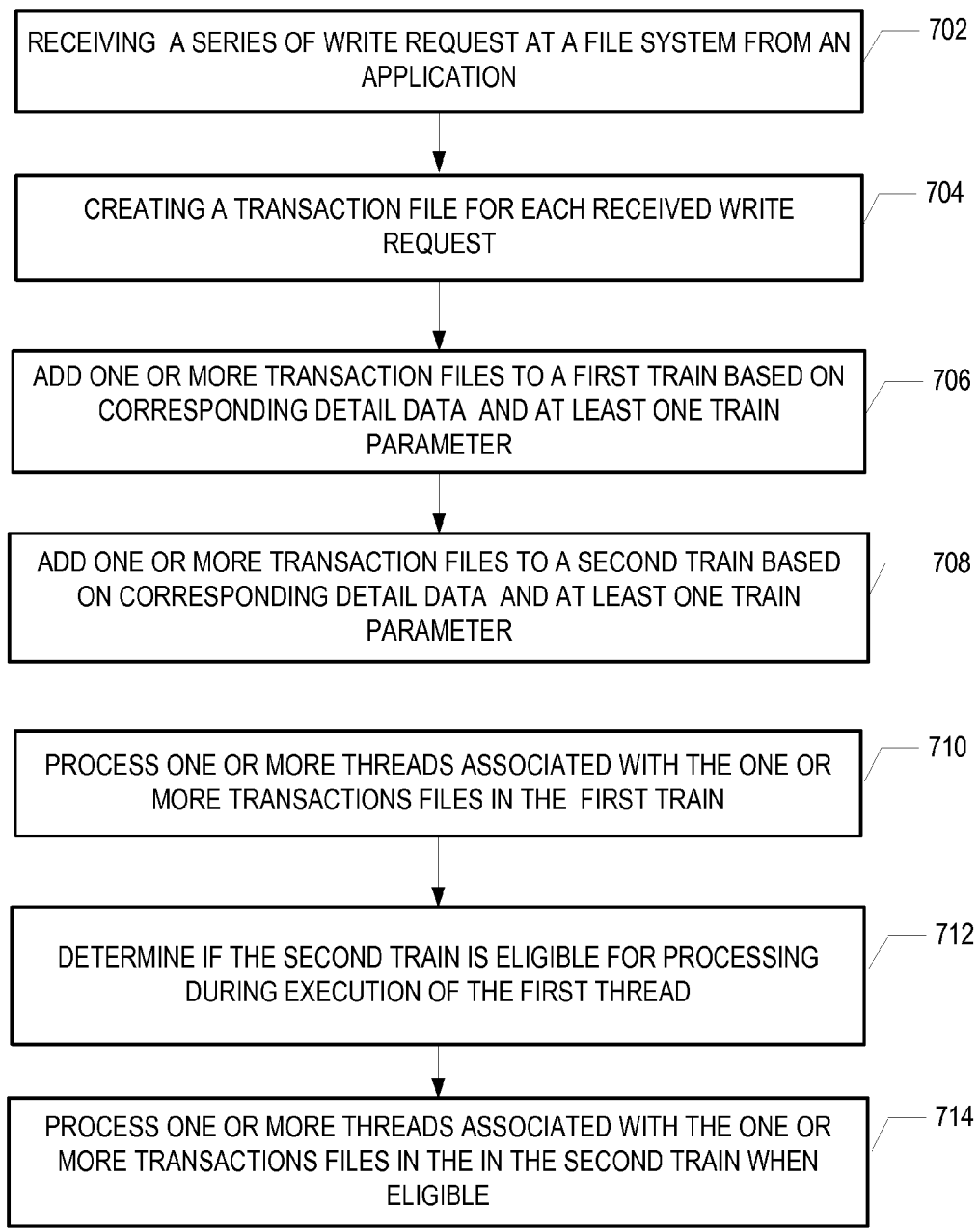
FIG. 7 illustrates a method for implementing parallel processing of write requests according to one aspect of the parallel processing system.

FIG. 7 depicts an exemplary process 700 performed by a file system 106 according to aspects the parallel processing system. At 702, the file system 106 receives a series of write requests over a period of time from an application executing on the computing device. The file system 106 creates transaction records for each write request at 704. At 706, the file system 106 adds one or more transaction records to a first train and adds one or more transaction records to a second train at 708. As described above, each transaction record is added to a train based on an order the corresponding write request was received and/or one or more train parameters.

At 710, the file system 106 begins processing threads associated with the one or more transaction records in the first train. The file system 106 determines whether to begin processing threads associated with the one or more transaction records in the second train at 712 while processing the threads associated with the one or more transaction records in the first train. As described above, parallel processing modules executed by the file system determines whether to initiate or begin the commit process for threads associated with second train when on one or more thread processing attributes indicate that the second train is eligible for parallel processing. At 714, file system 106 begins processing the threads associated with the second train while processing threads associated with the first train when the second train is deemed eligible.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for processing two or more write requests in parallel, the system comprising:
at least one processor;
a file system executing on the at least one processor to receive a series of write requests from at least one application being executed by the at least one processor, each write request comprising detail data and a thread for writing data; and
at least one processing module executed by the file system in response to the series of write requests to:
determine whether a first transaction list is eligible for processing based on at least one first thread processing attribute associated with the first transaction list, the first transaction list comprising a first one or more corresponding transaction records each identifying first corresponding detail data and a first corresponding thread;
execute the first corresponding thread for the first one or more corresponding transaction records to write the first corresponding detail data to a first at least one allocated block when the first transaction list is eligible for processing;
determine whether a second transaction list is eligible for processing based on the at least one first thread processing attribute and at least one second thread processing attribute associated with the second transaction list, the second transaction list comprising a second one or more corresponding transaction records each identifying second corresponding detail data and a second corresponding thread; and
execute the second corresponding thread for the second one or more corresponding transaction records during execution of the first corresponding thread to write the second corresponding detail data to a second at least one allocated block when the second transaction list is eligible for processing.

2. The system of claim 1 wherein:
the first corresponding detail data for each first one or more corresponding transaction records comprises a first corresponding data block size and first corresponding time data; and
the second corresponding detail data for each second one or more corresponding transaction records comprises a second corresponding data block size and second corresponding time data.

3. The system of claim 2 wherein the at least one processing module is executed by the file system to:
create the first one or more corresponding transaction records and the second one or more corresponding transaction records from the series of write requests;
add the first one or more corresponding transaction records to the first transaction list, each of the first one or more corresponding transaction records being added according to the first corresponding detail data and at least one list parameter; and
add the second one or more corresponding transaction records to the second transaction list, each of the second one or more corresponding transaction records being added according to the second corresponding detail data and the at least one list parameter.

4. The system of claim 3 wherein:
the at least one list parameter comprises a threshold data limit, and
the at least one processing module executed by the file system is further configured to:

calculate a first total data amount of the first one or more corresponding transaction records by summing the first corresponding data block sizes;

calculate a second total data amount of the second one or more corresponding transaction records by summing the second corresponding data block sizes;

add the first one or more corresponding transaction records to the first transaction list without the first total data amount exceeding the threshold data limit; and add the second one or more corresponding transaction records to the second transaction list without the second total data amount exceeding the threshold data limit.

5. The system of claim 1 wherein the at least one processing module executes the first corresponding thread and the second corresponding thread to perform a series of operations, the series of operations including an obtain operation, a copy operation, an allocate blocks operation, a write blocks operation, and a verify operation.

6. The system of claim 5 wherein each of the series of operations corresponds to a particular operation state of the corresponding thread.

7. The system of claim 5 wherein:
the at least one first thread processing attribute comprises a first thread state attribute, a first status attribute, a first train identification attribute, and a first train capacity attribute; and
the at least one second thread processing attribute comprises a second thread state attribute, a second status attribute, a second train identification attribute and a second train capacity attribute.

8. The system of claim 7 wherein the at least one processing module determines the second transaction list is eligible for processing during execution of the first thread when the first corresponding thread state attribute indicates the first corresponding thread has completed the obtain operation and the second train capacity attribute exceeds a minimum capacity.

9. The system of claim 1 wherein the first at least one allocated block and the second at least one allocated block are located in a storage area.

10. A method for processing two or more threads in parallel, the method comprising:
receiving a series of write requests from at least one application at at least one processor, each write request comprising detail data and a thread for writing data;
determining whether a first transaction list is eligible for processing at the at least one processor based on at least one first thread processing attribute associated with the first transaction list, the first transaction list comprising a first one or more corresponding transaction records each identifying first corresponding detail data and a first corresponding thread;
processing a first corresponding thread for the first one or more corresponding transaction records at the at least one processor to write the first corresponding detail data to a first at least one allocated block when the first transaction list is eligible for processing;
determining whether a second transaction list is eligible for processing at the at least one processor based on the at least one first thread processing attribute and at least one second thread processing attribute associated with the second transaction list, the second transaction list comprising a second one or more corresponding transaction records each identifying second corresponding detail data and a second corresponding thread; and processing a second corresponding thread for the second one or more corresponding transaction records at the at least one processor during execution of the first corresponding thread to write the second corresponding detail data to a second at least one allocated block when the second transaction list is eligible for processing.

11. The method of claim 10 wherein:
the first corresponding detail data for each first one or more corresponding transaction records comprises a first corresponding data block size and first corresponding time data; and
the second corresponding detail data for each second one or more corresponding transaction records comprises a second corresponding data block size and second corresponding time data.

12. The method of claim 11 further comprising:
creating the first one or more corresponding transaction records and the second one or more corresponding transaction records from the series of write requests;
adding the first one or more corresponding transaction records to the first transaction list, each of the first one or more corresponding transaction records being added according to the first corresponding detail data and at least one list parameter; and
adding the second one or more corresponding transaction records to the second transaction list, each of the second one or more corresponding transaction records being added according to the second corresponding detail data and the at least one list parameter.

13. The method of claim 12 wherein:
the at least one list parameter comprises a threshold data limit, and
the method further comprises:
calculating a first total data amount of the first one or more corresponding transaction records by summing the first corresponding data block sizes;
calculating a second total data amount of the second one or more corresponding transaction records by summing the second corresponding data block sizes;
adding the first one or more corresponding transaction records to the first transaction list without the first total data amount exceeding the threshold data limit; and
adding the second one or more corresponding transaction records to the second transaction list without the second total data amount exceeding the threshold data limit.

14. The method of claim 10 further comprising processing the first corresponding thread or the second corresponding thread to perform a series of operations, the series of operations including an obtain operation, a copy operation, an allocate blocks operation, a write blocks operation, and a verify operation.

15. The method claim 14 wherein each of the series of operations corresponds to a particular operation state of the corresponding thread.

16. The method of claim 14 wherein:
the at least one first thread processing attribute comprises a first thread state attribute, a first status attribute, a first train identification attribute, and a first train capacity attribute; and
the at least one second thread processing attribute comprises a second thread state attribute, a second status attribute, a second train identification attribute and a second train capacity attribute.

17. The method of claim 16 further comprising determining the second transaction list is eligible for processing during execution of the first thread when the first corresponding thread state attribute indicates the first corresponding thread has completed the obtain operation and the second train capacity attribute exceeds a minimum capacity.

18. The method of claim 10 wherein the first at least one allocated block and the second at least one allocated block are located in a storage area.

19. A system for processing two or more write requests in parallel comprising:
   at least one processor;
   a file system executing on the at least one processor to receive a series of write requests from at least one application being executed by the at least one processor, each write request comprising detail data and a thread for writing data;
   at least one processing module executed by the file system in response to the series of write requests to:
      determine whether a first train is eligible for processing based on at least one first thread processing attribute associated with the first train, the first train comprising at least one first car, each first car comprising a first one or more corresponding transaction records each identifying first corresponding detail data and a first corresponding thread;
      execute the first corresponding thread for the first one or more corresponding transaction records to write the first corresponding detail data to a first at least one allocated block when the first train is eligible for processing;
      determine whether a second train is eligible for processing based on the at least one first thread processing attribute and at least one second thread processing attribute associated with the second train, the second train comprising at least one second car, each second car comprising a second one or more corresponding transaction records each identifying second corresponding detail data and a second corresponding thread; and
      execute the second corresponding thread for the second one or more corresponding transaction records during execution of the first corresponding thread to write the second corresponding detail data to a second at least one allocated block when the second train is eligible for processing.

20. The system of claim 19 wherein the at least one processing module is executed by the file system to:
   create the first one or more corresponding transaction records and the second one or more corresponding transaction records from the series of write requests;
   add the first one or more corresponding transaction records to the first train, each of the first one or more corresponding transaction records being added according to the first corresponding detail data and at least one list parameter; and
   add the second one or more corresponding transaction records to the second train, each of the second one or more corresponding transaction records being added according to the second corresponding detail data and the at least one list parameter.

* * * * *